US012562815B2

(12) United States Patent
Wendt et al.

(10) Patent No.: US 12,562,815 B2
(45) Date of Patent: Feb. 24, 2026

(54) ENERGY EFFICIENT OPTICAL WIRELESS COMMUNICATION MODULE

(71) Applicant: SIGNIFY HOLDING B.V., Eindhoven (NL)

(72) Inventors: Matthias Wendt, Shanghai (DE); Pieter Johannes Stobbelaar, Eindhoven (NL); Paul Henricus Johannes Maria Van Voorthuisen, Sint Oedenrode (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 505 days.

(21) Appl. No.: 18/030,416

(22) PCT Filed: Sep. 30, 2021

(86) PCT No.: PCT/EP2021/076927
§ 371 (c)(1),
(2) Date: Apr. 5, 2023

(87) PCT Pub. No.: WO2022/073843
PCT Pub. Date: Apr. 14, 2022

(65) Prior Publication Data
US 2023/0379056 A1 Nov. 23, 2023

(30) Foreign Application Priority Data
Oct. 9, 2020 (EP) .................................... 20200946

(51) Int. Cl.
*H04B 10/40* (2013.01)
*H04B 10/079* (2013.01)

(52) U.S. Cl.
CPC ....... *H04B 10/40* (2013.01); *H04B 10/07953* (2013.01)

(58) Field of Classification Search
CPC .......................... H04B 10/40; H04B 10/07953
See application file for complete search history.

(56) References Cited

U.S. PATENT DOCUMENTS

| | | | | |
|---|---|---|---|---|
| 6,650,451 B1 * | 11/2003 | Byers | ................. | H04B 10/1125 398/158 |
| 7,142,786 B2 * | 11/2006 | Moursund | .......... | H04B 10/1123 398/118 |
| 9,438,337 B2 | 9/2016 | Byers | | |

(Continued)

FOREIGN PATENT DOCUMENTS

| | | |
|---|---|---|
| JP | 2011216999 A | 10/2011 |
| JP | 2016030512 A | 3/2016 |

(Continued)

OTHER PUBLICATIONS

Mohammad Dehghani Soltani et al., "Handover Modeling for Indoor Li-Fi Cellular Networks: The Effects of Receiver Mobility and Rotation", 6 pages.

*Primary Examiner* — Pranesh K Barua

(57) ABSTRACT

An optical wireless communication module comprising a plurality of optical transceivers and a controller, wherein the controller is configured to determine the optical transceivers to be used based on movement information of a UE, to activate the optical transceivers to be used and to deactivate other optical transceivers, such that it consumes less energy without compromising Quality of Service.

15 Claims, 3 Drawing Sheets

(56)      References Cited

U.S. PATENT DOCUMENTS

| | | | |
|---|---|---|---|
| 11,476,941 B2 * | 10/2022 | Csajaghy | H04B 10/40 |
| 11,750,286 B2 * | 9/2023 | Searcy | H04B 10/118 |
| | | | 343/702 |
| 2002/0089727 A1 * | 7/2002 | Alwan | H04B 10/40 |
| | | | 398/192 |
| 2002/0114045 A1 * | 8/2002 | Doucet | H01B 11/22 |
| | | | 398/121 |
| 2012/0070157 A1 * | 3/2012 | Fang | H04B 10/1141 |
| | | | 398/182 |
| 2017/0257167 A1 * | 9/2017 | Adams | H04B 10/1149 |
| 2018/0159576 A1 | 6/2018 | Chang et al. | |
| 2018/0331779 A1 | 11/2018 | Marcoccia et al. | |
| 2019/0082520 A1 | 3/2019 | Noshad et al. | |
| 2020/0287627 A1 * | 9/2020 | Johnson | H04B 10/27 |
| 2020/0396524 A1 * | 12/2020 | Adams | H04B 10/1129 |
| 2021/0195632 A1 * | 6/2021 | Jungnickel | H04B 10/25 |
| 2022/0321215 A1 * | 10/2022 | Stavridis | H04B 7/088 |

FOREIGN PATENT DOCUMENTS

| | | | | | |
|---|---|---|---|---|---|
| JP | 2018084981 A | | 5/2018 | | |
| JP | 2020042712 A | | 3/2020 | | |
| WO | WO-2020120968 A1 * | | 6/2020 | | H04B 10/116 |

* cited by examiner

ENERGY EFFICIENT OPTICAL WIRELESS COMMUNICATION MODULE

CROSS-REFERENCE TO PRIOR APPLICATIONS

This application is the U.S. National Phase application under 35 U.S.C. § 371 of International Application No. PCT/EP2021/076927, filed on Sep. 30, 2021, which claims the benefit of European Patent Application No. 20200946.0, filed on Oct. 9, 2020. These applications are hereby incorporated by reference herein.

FIELD OF THE INVENTION

The present invention relates to an optical wireless communication module comprising a plurality of optical transceivers, e.g., a segmented optical transceiver comprising a plurality of optical transceiver segments. Specifically, the present invention relates to an energy efficient optical wireless communication module.

BACKGROUND OF THE INVENTION

Optical wireless communication is a type of data communication using visible, infrared, or ultraviolet light to transmit data. A typical optical wireless communication system comprises a plurality of access points (APs), e.g., installed on a ceiling of a room. A user equipment, UE, e.g., a mobile phone, held by a user, can move within the room, while being wirelessly connected to a wired network, via an optical wireless communication link established between the APs and the UE.

Li-Fi (light fidelity) is one variant of optical wireless communication, capable of transmitting data at high speeds over the visible light, ultraviolet, and infrared spectrums. In terms of usage, a Li-Fi system is comparable to a Wi-Fi system. One major difference is that the Wi-Fi system uses modulated radio frequency (RF) signals to transmit data, whereas the Li-Fi system uses the modulated light to transmit data. Light emitting diodes (LEDs) which can be pulsed at a very high speed without noticeable effect on the lighting outputs and human eyes, are widely used by the Li-Fi systems in a variety of different applications, including wireless local area networks (WLAN), wireless personal area networks (WPAN).

Li-Fi has become popular in the last decade due to its advantages comparing to other well-known wireless communication technologies. For example, Li-Fi can provide a high transmission speed up to 100 Gbit/s, theoretically. Li-Fi can be used in electromagnetic sensitive areas such as in aircraft cabins, hospitals and nuclear power plants, without causing electromagnetic interferences, whereas RF communications cannot be used. Since the light can be easily blocked, e.g., by walls, Li-Fi can provide a more secured connection, and is more resistant to hacking, comparing to RF based wireless communication technologies, such as Wi-Fi.

However, as the UE may be moved and the user himself or a piece of furniture in the room may obstruct a direct light between the UE and the APs, depending on an exact location and angle of the UE, only some APs provided in certain locations may be used to communicate with the UE at a time. Thus, a large number of APs must be installed to secure a seamless connection and a good Quality of Service (QoS). However, such optical wireless communication systems would have a high energy consumption.

It would be desirable to provide an energy efficient optical wireless communication system without compromising QoS.

SUMMARY OF THE INVENTION

It is an object of the present invention to provide an optical wireless communication module with an improved energy efficiency and a high QoS.

According to a first aspect of the invention, this and other objects are achieved by an optical wireless communication module comprising a plurality of optical transceivers, each configured to receive and transmit information via optical communication, wherein the plurality of optical transceivers is set to directions different from each other; and a controller configured to independently control the plurality of optical transceivers; wherein the controller is configured to: determine a first set of optical transceivers of the plurality of optical transceivers to be used to receive and transmit information, based on movement information of a user equipment, UE, associated to said module, wherein remainder of the plurality of optical transceivers not belonging to the first set forms a second set of optical transceivers; activate the first set of optical transceivers for receiving and transmitting information; and deactivate at least one optical transceiver of the second set of optical transceivers.

By activating the optical transceivers to be used and deactivating some of the optical transceivers not to be used, the optical wireless communication module can effectively reduce the energy consumption of the wireless communication module, no matter it is used as a communication front end of an access point (AP) or of an end point (EP).

The movement information of the UE may represent a movement of the UE, e.g., caused by a user's movement. For example, the movement of the UE may be caused by a user walking with the UE, and/or lifting the UE from a table. The movement may be an angular movement, a linear movement, or a combination of angular and linear movement.

The optical wireless communication module may comprise a segmented optical transceiver comprising a plurality of optical transceiver segments. Each optical transceiver segment may face a direction different from other segments. That is, each optical transceiver segment has a field of view (FoV) for communicating with other optical communication devices within the FoV, via optical communication.

The FoVs of the plurality of optical transceivers may be non-overlapped.

Alternatively, the FoVs of the plurality of optical transceivers may be overlapped. Overlapped FoVs may avoid any blind spots and improve robustness of the communication by providing more than one optical transceiver covering one spot.

The optical wireless communication module may be a communication front end module of the UE for communicating with an AP of an optical wireless communication system. That is, some of the optical transceivers of the UE's communication front end module may be activated and/or deactivated based on the movement information of the UE itself. The optical wireless communication module may be an integrated part of the UE, or connected to the UE as a standalone apparatus.

Alternatively, or in combination, the optical wireless communication module may be a communication front end module of an AP of an optical wireless communication system for communicating with the UE. That is, some of the optical transceivers of the AP's communication front end may be activated and/or deactivated based on the movement information of the UE communicating with the AP. The optical wireless communication module may be an integrated part of the AP, or connected to the AP as a standalone apparatus.

Activating an optical transceiver may refer to powering on the optical transceiver from a power off status. Alternatively, it may refer to powering up the optical transceiver from a low power mode, such as a sleep mode, which consumes a significantly reduced electrical energy compared to when it is fully powered on.

Deactivating an optical transceiver may refer to powering off the optical transceiver from a power on status. Alternatively, it may refer to powering down the optical transceiver to a low power mode, such as a sleep mode, which consumes a significantly reduced electrical energy compared to when it is fully powered on.

The plurality of optical transceivers may be a plurality of Light-Fidelity, Li-Fi, transceivers. The controller may be configured to determine a candidate signal-noise-ratio, SNR, of an optical communication link of the first set of optical transceivers; upon determining the candidate SNR being larger than a first threshold value, handover from a current optical transceiver used for receiving and transmitting information to the first set of optical transceivers.

The controller may be configured to determine a current SNR of a current optical communication link of a current optical transceiver used for receiving and transmitting information; upon determining the current SNR being smaller than a second threshold value, handover from the current optical transceiver to the first set of optical transceivers.

The term "handover" may refer to a process of transferring an ongoing data communication from one link connected to a core network to another link. For example, when a UE is moving away from a first area covered by a first AP and entering a second area covered by a second AP, an ongoing data communication is transferred from the first AP to the second AP, such that the data communication is not interrupted when the UE leaves the range of the first AP.

When the optical wireless communication module is the communication front end module of the UE, there may be a current optical communication link between the current optical transceiver of the UE and the AP. After the first set of optical transceivers of the UE being activated, an optical communication link between the first set of optical transceivers of the UE and the AP may be set up before the handover happens.

When the optical wireless communication module is the communication front end module of the AP, there may be a current communication link between the current optical transceiver of the AP and the UE. After the first set of optical transceivers of the AP being activated, an optical communication link between the first set of optical transceivers of the AP and the UE may be set up before the handover happens.

The optical communication link of the first set of optical transceivers may be a candidate link. The SNR of the candidate optical communication link may be determined as the candidate SNR.

The SNR of the current optical communication link of the current optical transceiver used for receiving and transmitting information may be determined as the current SNR.

The handover from the current optical transceiver used for receiving and transmitting information to the first set of optical transceivers may be initialized when at least one of the candidate SNR and the current SNR satisfying a criterion.

The criteria including the first and second threshold values will be discussed in detail.

The first threshold value may be a value representing a minimum acceptable SNR for handover to the first set of optical transceivers. When the candidate SNR is larger than the first threshold value, the handover to the first set of optical transceivers may be initialized. This ensures that the handover would be initialized when the candidate link has a sufficiently good SNR, no matter whether the current SNR is good or bad.

The first threshold value may be a fixed value. The fixed value may be predetermined to meet different usage requirements. For example, when a consistent QoS is desired, a larger threshold value may be used for keeping the QoS consistent throughout the handover. When non-interrupted connections are desired, a smaller threshold value may be used for securing a fast handover to avoid any user experiencing interruptions. The second threshold value may be a value representing a minimum acceptable SNR to keep using the current optical transceiver for receiving and transmitting information. When the current SNR is smaller than the second threshold value, the handover to the first set of optical transceivers may be initialized. This ensures that the handover would be initialized when the current link no longer has a sufficiently good SNR, no matter whether the candidate SNR is good or bad.

Analogously, the second threshold value may be a fixed value.

Alternatively, or in combination, at least one of the first and second threshold value may be a dynamic value. That is, the first and/or the second threshold value may not be fixed. For example, the first threshold value may be set in relation to the determined current SNR, and/or the second threshold value may be set in relation to the determined candidate SNR, such that when a difference of the current SNR and the candidate SNR is reduced to a certain level, the handover may be initialized.

Since following the movement of the UE, it is highly likely that the candidate SNR would become better and the current SNR would become worse, by setting the first threshold value being smaller than the current SNR, and/or by setting the second threshold value being larger than the candidate SNR, a fast handover with a sufficiently consistent QoS may be achieved. This ensures that the handover can be initialized when the candidate SNR is still worse than the current SNR. In other words, it is highly likely that the candidate SNR would be already better than the current SNR when the handover is completed. This provides a more sophisticated control of the handover.

The movement information may comprise an acceleration information of the UE. The acceleration information may comprise an acceleration magnitude of the UE, and an acceleration direction of the UE.

The movement information may comprise a magnitude of moving speed of the UE and a moving direction of the UE.

Any of the first and second threshold value may be dynamically set according to the movement information of the UE.

For example, when the movement information comprises a large value of the acceleration magnitude of the UE and/or a large magnitude of moving speed, it indicates that the UE is moving fast or is about to move fast. Consequently, the current SNR would become worse quickly, and the candidate SNR would become better quickly. Thus, it is desirable to have a quick handover before the current SNR drops too much, e.g., by setting a smaller first threshold value and/or a larger second threshold value.

Similarly, when the movement information comprises a small value of the acceleration magnitude of the UE and/or a small magnitude of moving speed, it indicates that the UE is moving slowly or is about to move slowly. Consequently, the current SNR and the candidate SNR would change slowly. Thus, it is desirable to have a slow handover for keeping a consistent SNR, e.g., by setting a larger first threshold value and/or a smaller second threshold value.

The controller may be configured to: upon determining any of the acceleration magnitude of the UE and the magnitude of moving speed of the UE not being equal to zero, determine the first set of optical transceivers to be used to receive and transmit information based on the movement information of the UE.

When either the acceleration magnitude or the moving speed is not zero, it is known that the UE is moving or is about to move. Based on the speed and acceleration information of the UE, it is possible to estimate the first set of optical transceivers to be used following the movement of the UE.

The optical wireless communication module may further comprise a radio frequency, RF, transceiver for receiving and transmitting information via RF communication.

The RF communication may refer to any types of wireless communications based on RF signals of different frequencies. Examples of wireless communication protocols comprise but not limited to: Wi-Fi, cellular network protocols, including 2G, 3G, Long-Term Evolution (LTE), 4G, 5G.

The controller may be configured to upon receiving the movement information, initiate a RF communication for receiving and transmitting information to replace a current optical communication, and terminate the current optical communication; upon determining a stable status of the UE, initiate an optical communication for receiving and transmitting information, and terminate the initiated RF communication.

A hybrid wireless communication module may use both RF and optical communications to transmit and receive information. For example, only one of the RF and optical communications may be used to transmit and receive information at a time.

When the UE is moving or is about to move, a handover may happen. If the UE keeps moving for a while, multiple times of handovers may be expected until the UE comes to a relatively stable status. During the handovers, the communication between the UE and APs may have a reduced signal quality, or even be interrupted.

Unlike the optical communication, the RF signals can normally pass through objects within a room, such as a human body or a piece of furniture. Thus, using the RF communication to replace the optical communication when the UE is moving or is about to move, may avoid any signal quality degradation or communication interruption during the movement of the UE, such that a better user experience can be provided.

When the UE arrives at a relatively stable status after the movement, such as the UE has been placed on a table, the optical communication may be resumed, and the RF communication may be terminated.

The stable status may refer to a stable angular position of the UE.

The controller may be configured to initiate both a RF communication and an optical communication to transmit and receive information; determine the movement information and/or position information of the UE, based on a measurement of the RF communication; and determine the first set of optical transceivers to be used to receive and transmit information based on the movement information and/or the position information.

The controller may be configured to determine the movement information and/or the position information of the UE, based on a receiving signal strength indication, RSSI, of the RF communication.

Both the RF and optical communications of the hybrid wireless communication module may be used simultaneously to transmit and receive information at a time.

The movement and/or position information of the UE may be determined based on the measurement of the RF communication.

For example, by measuring RSSI of the RF communications between the UE and different APs, it is possible to determine a first group of APs communicating with the UE having high RSSIs being closer to the UE, and a second group of APs communicating with the UE having low RSSIs being remote from the UE. Consequently, it is possible to determine the movement information and the position information of the UE based on relative positions and changes of relative positions of the APs to the UE.

According to a second aspect of the invention, this and other objects are achieved by an optical wireless communication access point apparatus comprising the optical wireless communication module.

The optical wireless communication access point apparatus may be a Li-Fi access point apparatus.

The optical wireless communication access point (AP) apparatus is an optical networking hardware device allowing other optical wireless communication devices to connect to a wired network, e.g., a wired local area network. Such APs can provide optical wireless connections using wireless technology, e.g., Li-Fi, for other devices to connect to the wired network. Such APs can support connections of multiple optical wireless devices. For example, one AP may be connected to multiple UEs simultaneously.

The AP may be a standalone device connected to a router. The AP can also be an integrated part of the router.

According to a third aspect of the invention, this and other objects are achieved by an optical wireless communication end point apparatus comprising the optical wireless communication module.

The optical wireless communication end point apparatus may be a Li-Fi end point apparatus.

The optical wireless communication end point (EP) apparatus is an optical wireless communication device connecting to a wired network via an optical wireless communication AP. The end points apparatus may normally refer to the UE. Examples of the end point apparatus are: a mobile phone, a laptop, and a tablet.

According to a fourth aspect of the invention, this and other objects are achieved by an optical wireless communication system comprising at least one of the optical wireless communication access point apparatus, and the optical wireless communication end point apparatus.

The optical wireless communication system may be a Li-Fi system.

According to a fifth aspect of the invention, this and other objects are achieved by an optical wireless communication method of an optical wireless communication module comprising a plurality of optical transceivers, each plurality of optical transceivers for receiving and transmitting information via optical communication, wherein the plurality of optical transceivers is set to directions different from each other; and a controller for independently controlling the plurality of optical transceivers; the method comprising: determining a first set of optical transceivers of the plurality of optical transceivers to be used to receive and transmit information, based on movement information of a user equipment, UE, associated to said module, wherein remainder of the plurality of optical transceivers not belonging to the first set forms a second set of optical transceivers; activating the first set of optical transceivers for receiving and transmitting information; and deactivating at least one optical transceiver of the second set of optical transceivers.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figures 1, 2:
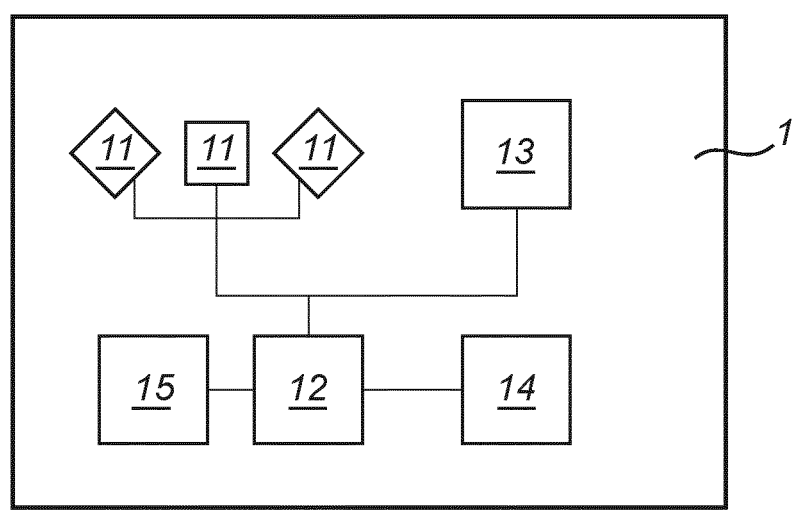
FIG. 1 shows a schematic illustration of an example of an optical wireless communication module.
FIG. 2 shows a schematic illustration of an example of a plurality of optical transceivers of an optical wireless communication module.

FIG. 1 shows a schematic illustration of an example of an optical wireless communication module.

The module 1 comprises a plurality of optical transceivers 11, each configured to receive and transmit information via optical communication, wherein the plurality of optical transceivers 11 is set to directions different from each other.

The plurality of optical transceivers 11 may be a plurality of Li-Fi transceivers. The module 1 may be a Li-Fi communication module.

The module 1 comprises a controller 12 configured to independently control the plurality of optical transceivers 11.

The module 1 may comprise a RF transceiver 13 for receiving and transmitting information via RF communication.

The RF communication may be any types of wireless communications based on RF signals of different frequencies. Examples of wireless communication protocols comprise: Wi-Fi, cellular network protocols, including 2G, 3G, Long-Term Evolution (LTE), 4G, 5G.

The module 1 may comprise a memory unit 14 for storing information. The memory unit 14 may be a separate unit, as shown in FIG. 1, or an integrated part of the controller 12. The stored information may comprise operation parameters of module 1, and/or parameters of the plurality of optical transceivers 11, and the RF transceiver 13.

The module 1 may comprise an interface 15 for receiving movement information. The received movement information may be sent to the controller 12 for processing.

FIG. 2 shows a schematic illustration of an example of a plurality of optical transceivers of an optical wireless communication module.

In this example, an artificial coordinate system with three axes X-Y-Z are introduced for illustration.

The optical wireless communication module may comprise a segmented optical transceiver 16 as shown in FIG. 2. The segmented optical transceiver 16 may comprise multiple optical transceiver segments arranged in three different layers 161, 162 and 163. The multiple optical transceiver segments are set to directions different from each other. Each optical transceiver segment can independently receive and transmit information via optical communication.

The segmented optical transceiver 16 of FIG. 2 comprises a mounting plate 164, which is parallel to the axes X and Y, and perpendicular to the axis Z.

The first layer 161 comprises only one optical transceiver segment 1610 facing a direction substantially perpendicular to the mounting plate 164. In other words, the optical transceiver segment 1610 has a field of view (FoV) being substantially parallel to the axis Z, for communicating with other optical communication devices provided within its FoV. The second layer 162 comprises multiple optical transceiver segments 1620, 1621, 1622, . . . , facing different directions. That is, each of the multiple optical transceiver segments 1620, 1621, 1622, . . . , can communicate with optical communication devices provided within its FoV. These multiple optical transceiver segments 1620, 1621, 1622, . . . , may be set angularly evenly around the axis Z, as shown in FIG. 2, such that each FoV has a same volume. These FoVs of the optical transceiver segments may be non-overlapped or overlapped. When the FOVs are overlapped, communication blind spots may be effectively avoided.

The third layer 163 comprises fewer optical transceiver segments 1630, 1631, . . . , comparing to the second layer 162. These optical transceiver segments 1630, 1631, . . . , are set to different directions (having different FoVs). In this example, their directions are almost parallel to the mounting plane 164 (i.e. almost parallel to the axes X and Y).

The segmented optical transceiver 16 can be used to communicate with multiple optical communication devices provided within a same or different FoVs of its multiple optical transceiver segments.

When it is determined that a first set of optical transceiver segments is to be used to receive and transmit information, these optical transceiver segments can be activated for receiving and transmitting information. At least one of remainder of the optical transceiver segments not to be used can be deactivated.

In this example, since the segmented optical transceiver 16 has a hemisphere shape, most connections would be expected to be made by the optical transceiver segments of the second layer 162. Consequently, a larger number of optical transceiver segments are provided in the second layer 162, than in the first and third layer 161, 163.

The segmented optical transceiver 16 may have different shapes. The shape of the segmented optical transceiver 16 and the exact arrangement of its optical transceiver segments may depend on specific usages.

Figure 3:
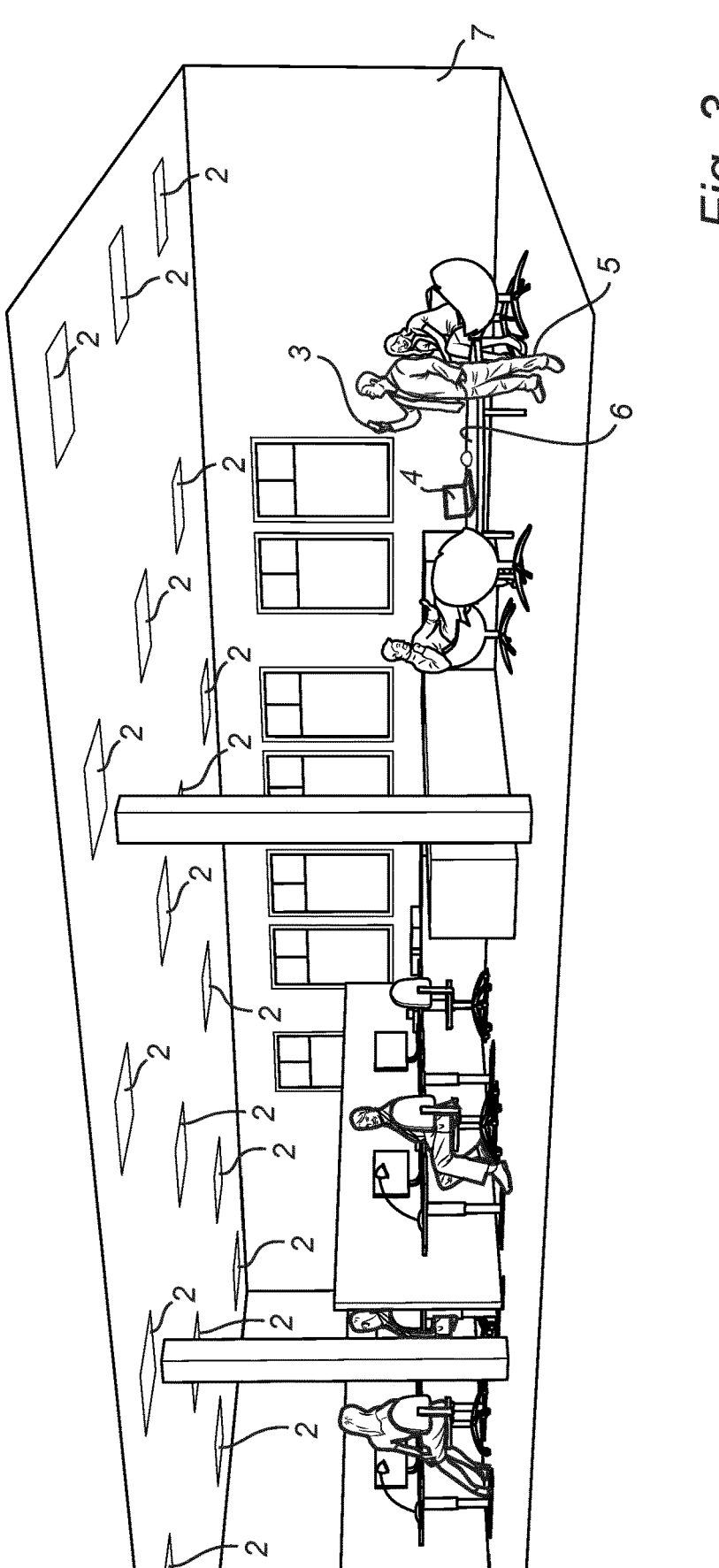
FIG. 3 schematically shows an example environment comprising an optical wireless communication system.

FIG. 3 is a schematic example environment comprising an optical wireless communication system.

The optical wireless communication system comprises a plurality of optical wireless communication access point apparatuses (APs) 2 mounted on a ceiling of a room 7. There is a user 5 holding a first UE 3, e.g., a mobile phone, as an optical wireless communication end point apparatus, moving within the room 7. There is a second UE 4, e.g., a laptop, being stably placed on a table 5 within the room 7.

Each of the APs 2 and the UEs 3, 4 of the optical wireless communication system may comprise the optical wireless communication module. Alternatively, only some of the APs 2 and/or the UEs 3, 4 may comprise the module.

In real world usages, the relative positions of the UEs 3, 4 and the APs 2 are not static since the UEs 3, 4 may be moved, e.g., by the user 5. When one UE 3, 4 is moving or is about to move, a current optical communication link used for communication between the UE 3, 4 and one AP 2 may no longer be available for communication after the UE 3, 4 has been moved to a new position or a new angle, as an object, e.g., the table 6 or the user 5, may block an direct light of sight between the UE 3, 4 and the AP 2. Instead, a new optical communication link may be established for communication between the UE 3, 4 and the APs 2 after the UE 3, 4 has been moved to the new position or the new angle.

Based on the movement information of the UE 3, 4 associated to the optical wireless communication module, the controller 12 of the module is configured to determine a first set of optical transceivers of the plurality of optical transceivers to be used to receive and transmit information, wherein remainder of the plurality of optical transceivers not belonging to the first set forms a second set of optical transceivers. The controller 12 is configured to activate the first set of optical transceivers for receiving and transmitting information, and deactivate at least one optical transceiver of the second set of optical transceivers.

For example, the optical wireless communication module is a communication front end module of the UE 3 for communicating with one AP 2. When the UE 3 is moving, the controller 12 can determine that some optical transceivers of the UE's communication front end module cannot be used for communication after the UE 3 is moved to the new position or the new angle. At least one of these optical transceivers of the UE's communication front end module not to be used can be deactivated for reducing energy consumption. Those optical transceivers of the UE's communication front end module determined to be used may be activated for preparing establishing the new optical communication link.

Alternatively, or in combination, for example, the optical wireless communication module is a communication front end module of one AP 2 for communicating with the UE 3. When the UE 3 is moving, the movement information of the UE may be transmitted to the AP 2, by any known methods. The controller 12 of the module of the AP 2 can determine that some optical transceivers of the AP's communication front end module may no longer be used for communication after the UE 3 is moved to the new position or the new angle. At least one of these not to be used optical transceivers of the AP's communication front end module can be deactivated for reducing energy consumption. Those optical transceivers of the AP's communication front end module determined to be used may be activated for preparing establishing the new optical communication link.

That is, no matter the module is used as the communication front end module of the AP 2 and/or the UE 3, 4, its optical transceivers 11 to be used may be activated and its optical transceivers 11 not to be used may be deactivated, based on the movement information of the UE 3, 4. The activation and deactivation of optical transceivers can improve energy efficiency of the module and provide a seamless data communication having a good Quality of Service (QoS) between the APs 2 and the UEs 3, 4.

The movement information of the UE 3, 4 may comprise an acceleration information of the UE 3, 4. The acceleration information may comprise an acceleration magnitude of the UE 3, 4, and an acceleration direction of the UE 3, 4.

The movement information of the UE 3, 4 may be detected by a sensor of the UE 3, 4, e.g., a gyrator or an accelerometer.

The acceleration may be characterized as a 3-axis acceleration in a coordinate system comprising three axes, i.e. axes X-Y-Z. The acceleration may be accelerations along the axis X, the axis Y, and/or the axis Z, respectively. The acceleration may be rotational acceleration around the axis X, the axis Y, and/or the axis Z, respectively.

The movement information may comprise a magnitude of moving speed of the UE 3, 4 and a moving direction of the UE 3, 4.

The speed may be characterized as a 3-axis speed in the coordinate system. The speed may be along the axis X, the axis Y, and/or the axis Z, respectively.

If the movement information indicated that the UE 3, 4 is in a stable status, e.g., when the acceleration magnitude and the moving speed are both zero, it is known that the UE 3, 4 is not moving and is not about to move. The optical transceivers currently used for communication may continue being used. Consequently, the controller 12 would not take any actions, such as activating and deactivation optical transceivers.

If the movement information indicated that the UE 3, 4 is not in a stable status, e.g., when the acceleration magnitude or the moving speed is not zero, it is known that the UE 3, 4 is moving or is about to move. The optical transceivers currently used for communication may not continue being used. The controller 12 would determine the optical transceivers 11 to be activated and deactivated, respectively.

Based on the movement information of the UE 3, 4, it is possible to estimate a movement track of UE 3, 4. Consequently, it is possible to determine the optical transceivers of the module to be used and/or not to be used for communication at a future time point, no matter the module is the communication front end module of the AP 2 or of the UE 3, 4.

The controller 12 may be configured to determine a candidate SNR of an optical communication link of the first set of optical transceivers; upon determining the candidate SNR being larger than a first threshold value, handover from a current optical transceiver used for receiving and transmitting information to the first set of optical transceivers.

The controller 12 may be configured to determine a current SNR of a current optical communication link of a current optical transceiver used for receiving and transmitting information; upon determining the current SNR being smaller than a second threshold value, handover from the current optical transceiver to the first set of optical transceivers.

That is, handovers may be initialized before the current SNR drops too much due to the movement of the UE 3, 4. Alternatively, or in combination, as soon as the SNR of the candidate link is determined to be good enough (i.e. being larger than the first threshold value), the handover can be initialized, and a seamless communication can be achieved.

The first and the second threshold value may be used individually or together to trigger the handover.

The first and the second threshold value may be predetermined fixed values. For example, any of them may be predetermined to meet a system requirement, such as QoS.

The first and the second threshold value may be dynamical values.

For example, the first threshold value may be set in relation to the determined current SNR. A difference of the current SNR and the first threshold value may be ΔSNR1. That is, when the difference of the current SNR and the candidate SNR is less than ΔSNR1, the handover may be initialized.

For example, the second threshold value may be set in relation to the determined candidate SNR. A difference of second threshold value and the candidate SNR may be ΔSNR2. That is, when the difference of the current SNR and the candidate SNR is less than the ΔSNR2, the handover may be initialized.

In other words, as long as the difference of the current SNR and the candidate SNR is small enough, the handover may be initialized. The difference of the current SNR and the candidate SNR (ΔSNR1, ΔSNR2) for triggering the handover may be predetermined.

Any of the first and the second threshold value may be dynamically set according to the movement information of the UE 3, 4.

For example, when the movement information indicates that the UE 3, 4 is moving fast or is about to move fast (e.g., a large value of the acceleration magnitude of the UE and/or a large magnitude of moving speed), the current SNR would become worse quickly, and the candidate SNR would become better quickly. Thus, by setting a smaller first threshold value and/or a larger second threshold value, a quick handover is achieved before the current SNR drops too much.

Similarly, when the movement information indicates that the UE 3, 4 is moving slowly or is about to move slowly (e.g., a small value of the acceleration magnitude of the UE and/or a small magnitude of moving speed), the current SNR and the candidate SNR would change slowly. Thus, by setting a larger first threshold value and/or a smaller second threshold value, a slow handover with a consistent SNR is achieved.

Thus, by dynamically setting the threshold values based on the movement information of the UE, the handovers can be accurately controlled to meet different requirements, such as QoS.

A hybrid wireless communication module, comprising both the RF transceiver 13 and the optical transceivers 11, may use both RF and optical communications to transmit and receive information. Such hybrid wireless communication module may provide additional advantages.

The controller 12 may be configured to upon receiving the movement information, initiate a RF communication for receiving and transmitting information to replace a current optical communication, and terminate the current optical communication; upon determining a stable status of the UE 3, 4, initiate an optical communication for receiving and transmitting information, and terminate the initiated RF communication.

Since the RF signals can pass through objects, such as the user 5 or the table 6 within the room 7, which would block optical communications, RF communications can be used to replace the optical communications when the UE 3, 4, is moving. Signal quality degradation, or even communication interruption during the movement of the UE 3, 4 can be avoided, such that a better user experience can be provided. When the UE 3, 4 is in a stable status after the movement, the optical communication may be resumed, and the RF communication may be terminated. That is, the RF communications can be used to replace the optical communication when the UE is moving or is about to move.

Alternatively, the controller 12 may be configured to simultaneously use RF communications and optical communications to transmit and receive information. The controller 12 may determine the movement information and/or position information of the UE 3, 4, based on a measurement of the RF communication; and determine the first set of optical transceivers to be used to receive and transmit information based on the movement information and/or the position information.

The controller 12 may be configured to determine the movement information and/or the position information of the UE, based on a RSSI of the RF communication.

For example, by measuring RSSI of the RF communications between the UE 3, 4 and the APs 2, it is possible to determine that a first group of APs 2 communicating with the UE 3, 4 having high RSSIs are being closed to the UE, and a second group of APs 2 communicating with the UE 3, 4 having low RSSIs are remote from the UE 3, 4. Consequently, it is possible to determine the movement information and/or the position information of the UE based on relative positions of the APs 2 to the UE 3, 4 and/or changes of relative positions of the APs 2 to the UE 3, 4.

Figure 4:
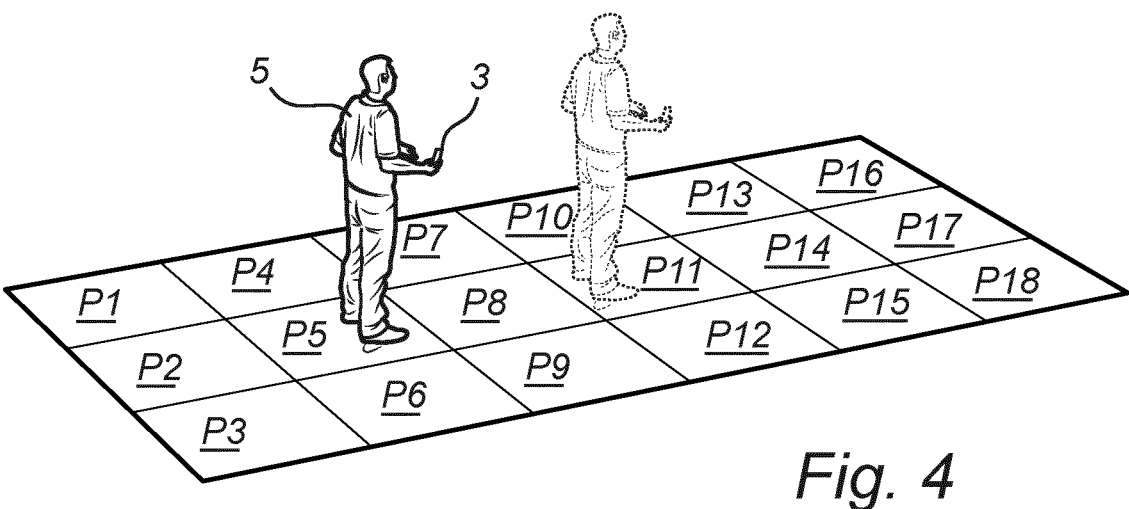
FIG. 4 shows an example of using an optical wireless communication access point apparatus comprising an optical wireless communication module.

FIG. 4 shows an example of using an optical wireless communication access point apparatus comprising the optical wireless communication module.

As shown in FIG. 4, a floorplan is divided into 18 portions, i.e. portion P1, P2, . . . , and P18. In the beginning, the user 5 holding the UE 3 is at a first position within the portion P5.

In this example, the AP (not shown) comprises the optical wireless communication module. The plurality of optical transceivers of the module of the AP is set to directions different from each other, such that when the user 5 holding the UE 3 is within any portion of the floorplan, there will be at least one optical transceiver of the module which can be used to communicate with the UE 3.

Some of the optical transceivers of the module of the AP have been activated such that when the user 5 is within any of the portions P1 to P9, the AP can communicate with the UE 3 by at least one of the activated optical transceivers. In other words, the portions P1 to P9 of the floorplan are "activated" for communicating with the UE 3.

Some of the optical transceivers of the module of the AP have been deactivated such that the AP cannot communicate with any UE within any of the portions P10 to P18. In other words, the portions P10 to P18 of the floorplan are "deactivated" for communicating with any UE.

Then, the user 5 starts moving, and the AP receives the movement information of the UE 3. The movement information may be detected, by e.g., a gyrator or an accelerometer of the UE 3. The movement information may be transmitted to the AP by the UE 3.

In this example, the movement information of the UE 3, e.g., an acceleration and/or a speed towards a second position within the portion P11, is measured and transmitted to the AP.

Based on the movement information, it is determined that the user 5 may be moved towards portion P8. Its optical transceivers for "activating" the portions closed to the portion P8, e.g., portions P4 to P12, may be activated. It is determined that the user 5 may be moved away from the its current position, i.e. portion P5. Some of the portions closed to the portion P5, e.g., portions P1, P2 and P3 can be deactivated.

Here, the expression "activating a portion" may refer to activating at least one optical transceiver of the optical wireless communication module of the AP such that when the user 5 holding the UE 3 is within the portion, the AP can communicate with the UE 3.

The expression "deactivating a portion" may refer to deactivating at least one optical transceiver of the optical wireless communication module of the AP such that the AP cannot communicate with any UE within the portion.

Finally, the user 5 moves through the portion P8 and stops at the second position within the portion P11. The movement information of the UE 3, e.g., a deacceleration and/or a zero speed, can be measured and transmitted to the AP.

Based on the movement information, it is determined that the user 5 may have stopped at the second position within the portion P11. Its optical transceivers for "activating" the portions closed to the portion P11, e.g., portions P7 to P15, may be activated. It is also determined that the user 5 may have been moved away from the first position within the portion P5. Then, the portions P1 to P6 may be deactivated.

In this example, when the user 5 is at the first position, the portions P1 to P9 are activated. Following the movement of the user from the first position to the second position, three new portions P10 to P12 are activated and the previously activated portions P1 to P3 are deactivated. When the user 5 finally stops at the second position, three new portions P13 to P15 are activated and the previously activated portions P4 to P6 are deactivated.

That is, the optical wireless communication module of the AP may activate some of its optical transceivers such that the portions of the floorplan closest to the user's current position are activated for communication, such that a seamless connection with a good QoS can be secured even if the user 5 holding the UE 3 keeps moving. In this example, 9 out of 18 portions are activated at any time for communication.

The optical wireless communication module of the AP may deactivate some of its optical transceivers such that the portions of the floorplan being remote from the user's current position are deactivated, such that energy efficiency of the optical wireless communication module can be improved. In this example, 9 out of 18 portions are deactivated at any time.

Analogously, if the UE also comprises the optical wireless communication module, some of the optical transceivers of the module of the UE may be activated and the remainder may be deactivated, based on its own movement information. Consequently, the energy consumption of the UE may be reduced without compromising user experiences.

Figure 5:
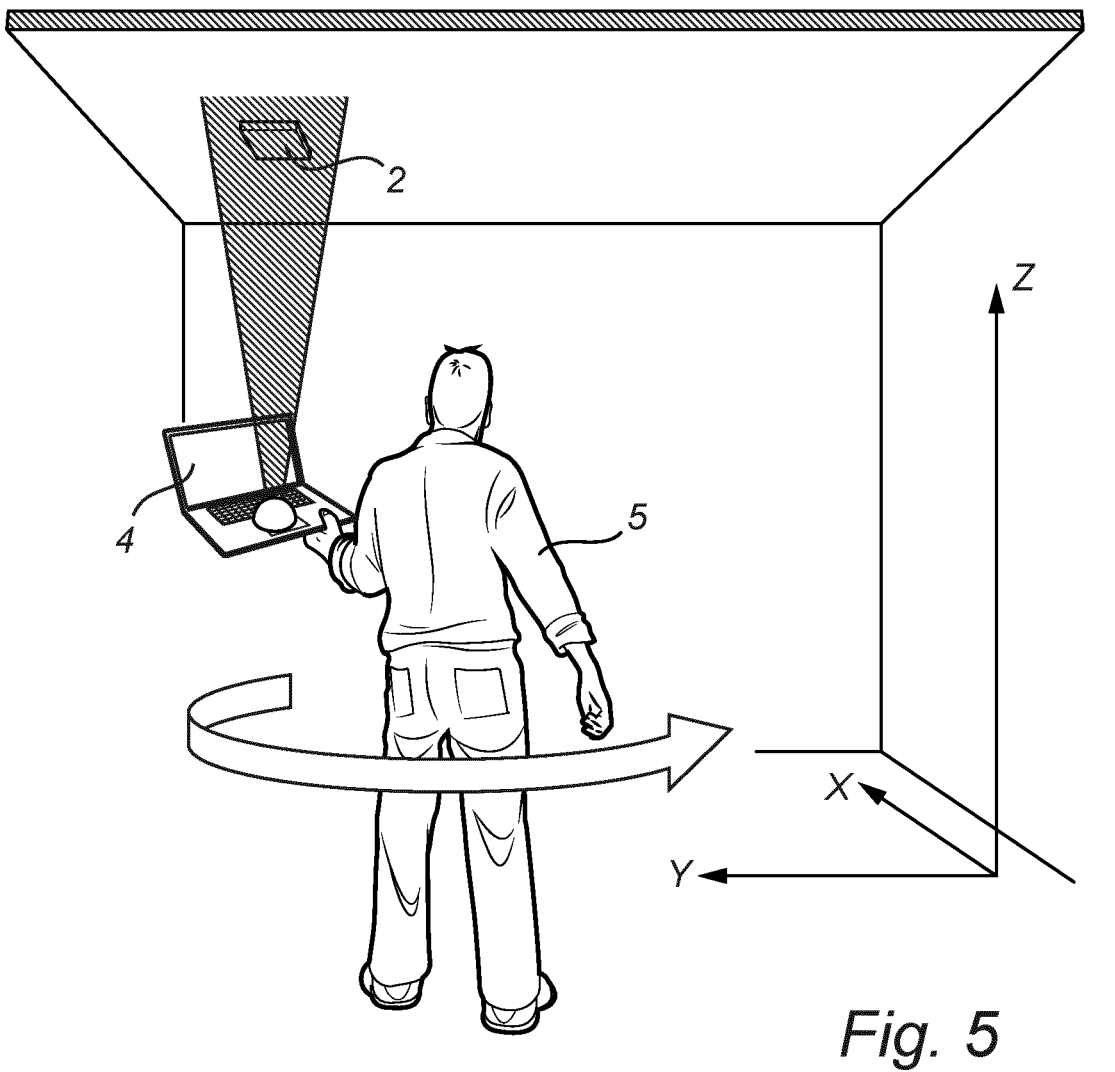
FIG. 5 shows an example of using an optical wireless communication end point apparatus comprising an optical wireless communication module.

FIG. 5 shows a schematic illustration of using an optical wireless communication end point apparatus comprising the optical wireless communication module.

In this example, the user 5 holding the UE 4 comprising the optical wireless communication module having the segmented optical transceiver shown in FIG. 2. The plurality of its optical transceiver segments is set to directions different from each other, for communicating with the AP 2.

In this example, the artificial coordinate system with three axes X-Y-Z is introduced for illustration, wherein the axes X and Y are parallel to a floor and the axis Z is perpendicular to the axes X and Y.

As shown in FIG. 5, the user 5 holding the UE 4 turns around an axis being parallel to the Z axis, which causes the UE 4 and its segmented optical transceiver to rotate following a rotational direction around the axis Z.

Prior to the turning of the user 5, a first optical transceiver segment of the segmented optical transceiver is used for communicating with the AP 2. The first optical transceiver segment has a field of view (FoV) facing the AP 2. All other segments of the segmented optical transceiver are deactivated.

Then, the user 5 starts turning around. The movement information of the UE 4 may be detected, by e.g., a gyrator or an accelerometer of the UE 4. In this example, the movement information of the UE 4, e.g., a rotational acceleration and/or an angle speed around the axis Z, may be detected.

Based on the movement information, the optical wireless communication module of the UE 4 knows that the UE 4 may turn around, such that a second optical transceiver segment arranged adjacent to the first optical transceiver segment will have the FoV facing the AP 2, instead of the first optical transceiver segment. The second optical transceiver segment may be activated based on the movement information.

If the user 5 stops turning when the second optical transceiver segment having the FoV facing the AP 2, the movement information of the UE 4, e.g., a deacceleration and/or a zero speed, can be measured.

Based on the movement information, the optical wireless communication module of the UE 4 knows that the UE 4 may stop turning. The second optical transceiver segment would have the FoV facing the AP 2 and the first optical transceiver segment has been turn away and would not face the AP 2 anymore. The first optical transceiver segment may be deactivated.

In this example, the first optical transceiver segment has been used for communicating with the AP 2, prior to the turning of the user 5. Following the turning of the user 5, the second optical transceiver segment has been determined to be used for communication and has been activated. When the user 5 finally stops, the second optical transceiver segment is used for communication, and the first optical transceiver segment is deactivated.

That is, the optical wireless communication module of the UE 4 may activate some of its optical transceivers facing and about to face the AP 2 for communication, such that a seamless connection with a good QoS can be secured even if the user 5 holding the UE 4 keeps moving.

The optical wireless communication module of the UE 4 may deactivate the optical transceivers not facing the AP 2, such that energy efficiency of the optical wireless communication module can be improved.

Analogously, if the AP 2 also comprises the optical wireless communication module, the module of the AP 2 can determine and activate some of its optical transceivers, and deactivate some of the rest optical transceivers, based on the movement information of the UE 4. Consequently, the energy consumption of the AP 2 may be reduced without compromising user experiences.

The person skilled in the art realizes that the present invention by no means is limited to the preferred embodiments described above. On the contrary, many modifications and variations are possible within the scope of the appended claims. For example, the optical wireless communication module may be arranged in many different ways, e.g., the optical transceivers may be of different types, numbers and arrangements of directions. Such details are not considered to be an important part of the present invention, which relates to the energy efficient optical wireless communication module.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. An optical wireless communication module, comprising:

a plurality of optical transceivers, each configured to receive and transmit information via optical communication, wherein the plurality of optical transceivers is set to directions different from each other; and a controller configured to independently control the plurality of optical transceivers;

wherein the controller is configured to:

determine a first set of optical transceivers of the plurality of optical transceivers to be used to receive and transmit information, based on movement information of a user equipment, UE, associated to said module, wherein remainder of the plurality of optical transceivers not belonging to the first set forms a second set of optical transceivers;

activate the first set of optical transceivers for receiving and transmitting information; and deactivate at least one optical transceiver of the second set of optical transceivers.

2. The optical wireless communication module according to claim 1, wherein the controller is configured to:

determine a candidate signal-noise-ratio, SNR, of an optical communication link of the first set of optical transceivers;

upon determining the candidate SNR being larger than a first threshold value, handover from a current optical transceiver used for receiving and transmitting information to the first set of optical transceivers.

3. The optical wireless communication module according to claim 1, wherein the controller is configured to:

determine a current SNR of a current optical communication link of a current optical transceiver used for receiving and transmitting information;

upon determining the current SNR being smaller than a second threshold value, handover from the current optical transceiver to the first set of optical transceivers.

4. The optical wireless communication module according to claim 1, wherein the movement information comprises an acceleration information of the UE.

5. The optical wireless communication module according to claim 4, wherein the acceleration information comprises: an acceleration magnitude of the UE, and an acceleration direction of the UE.

6. The optical wireless communication module according to claim 1, wherein the movement information comprises: a magnitude of moving speed of the UE and a moving direction of the UE.

7. The optical wireless communication module according to claim 5, wherein the controller is configured to:

upon determining any of the acceleration magnitude of the UE and the magnitude of moving speed of the UE not being equal to zero, determine the first set of optical transceivers to be used to receive and transmit information based on the movement information of the UE.

8. The optical wireless communication module according to claim 1, wherein the optical wireless communication module further comprises a radio frequency, RF, transceiver for receiving and transmitting information via RF communication.

9. The optical wireless communication module according to claim 8, wherein the controller is configured to:

upon receiving the movement information, initiate a RF communication for receiving and transmitting information to replace a current optical communication, and terminate the current optical communication;

upon determining a stable status of the UE, initiate an optical communication for receiving and transmitting information, and terminate the initiated RF communication.

10. The optical wireless communication module according to claim 8, wherein the controller is configured to:

initiate both a RF communication and an optical communication to transmit and receive information;

determine the movement information and/or position information of the UE, based on a measurement of the RF communication; and determine the first set of optical transceivers to be used to receive and transmit information based on the movement information and/or the position information.

11. The optical wireless communication module according to claim 10, wherein the controller is configured to determine the movement information and/or the position information of the UE, based on a receiving signal strength indication, RSSI, of the RF communication.

12. The optical wireless communication module according to claim 1, wherein the plurality of optical transceivers is a plurality of Light-Fidelity, Li-Fi, transceivers.

13. An optical wireless communication access point apparatus comprising the optical wireless communication module of claim 1.

14. An optical wireless communication end point apparatus comprising the optical wireless communication module of claim 1.

15. An optical wireless communication method of an optical wireless communication module comprising:

a plurality of optical transceivers, each plurality of optical transceivers for receiving and transmitting information via optical communication, wherein the plurality of optical transceivers is set to directions different from each other; and a controller for independently controlling the plurality of optical transceivers;

the method comprising:

determining a first set of optical transceivers of the plurality of optical transceivers to be used to receive and transmit information, based on movement information of a user equipment, UE, associated to said module, wherein remainder of the plurality of optical transceivers not belonging to the first set forms a second set of optical transceivers;

activating the first set of optical transceivers for receiving and transmitting information; and deactivating at least one optical transceiver of the second set of optical transceivers.

* * * * *